Sept. 10, 1929.   C. T. HOWSON   1,727,507
CORN HUSKING MACHINE
Filed Nov. 2, 1925   3 Sheets-Sheet 1
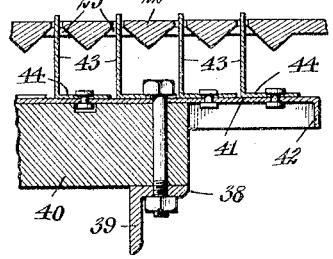
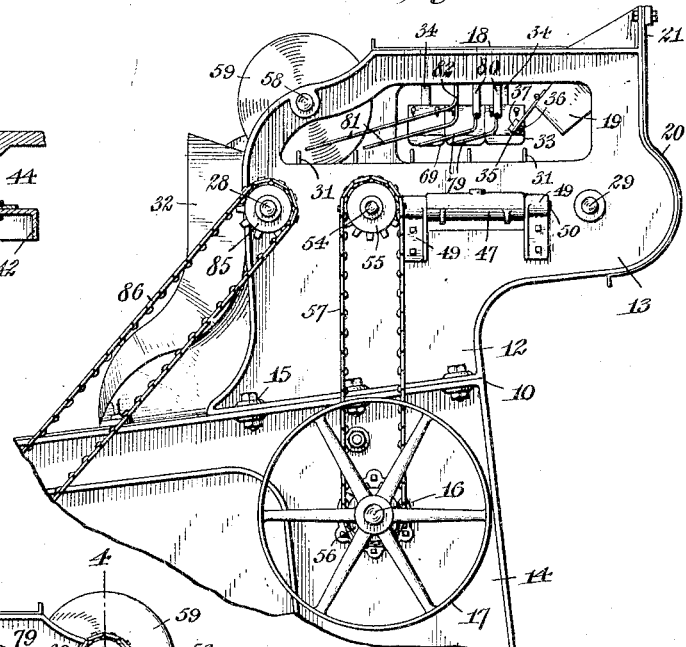
Charles T. Howson, Inventor.
By Emil Neuhart
Attorney.
Witness:
J. J. Oberst.

Sept. 10, 1929.    C. T. HOWSON    1,727,507
CORN HUSKING MACHINE
Filed Nov. 2, 1925    3 Sheets-Sheet 2
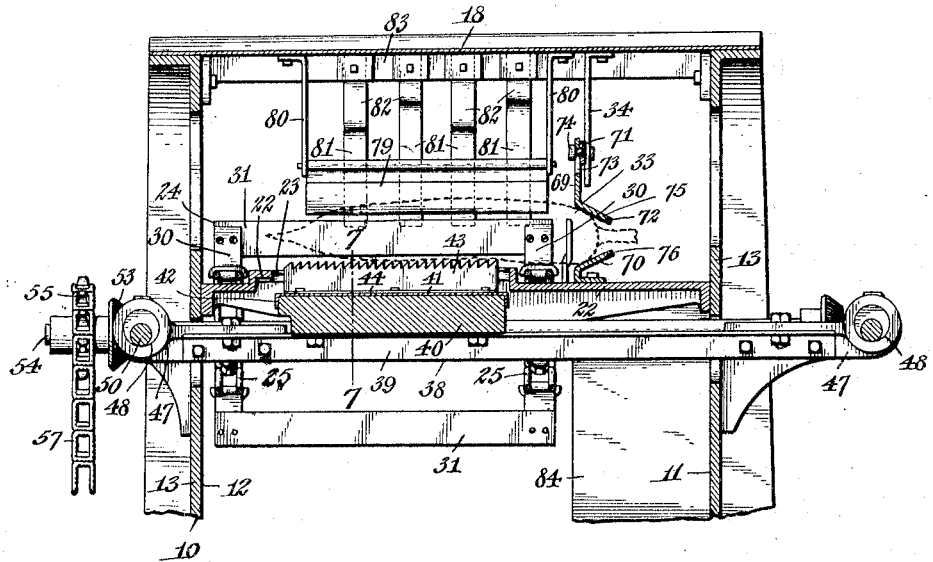
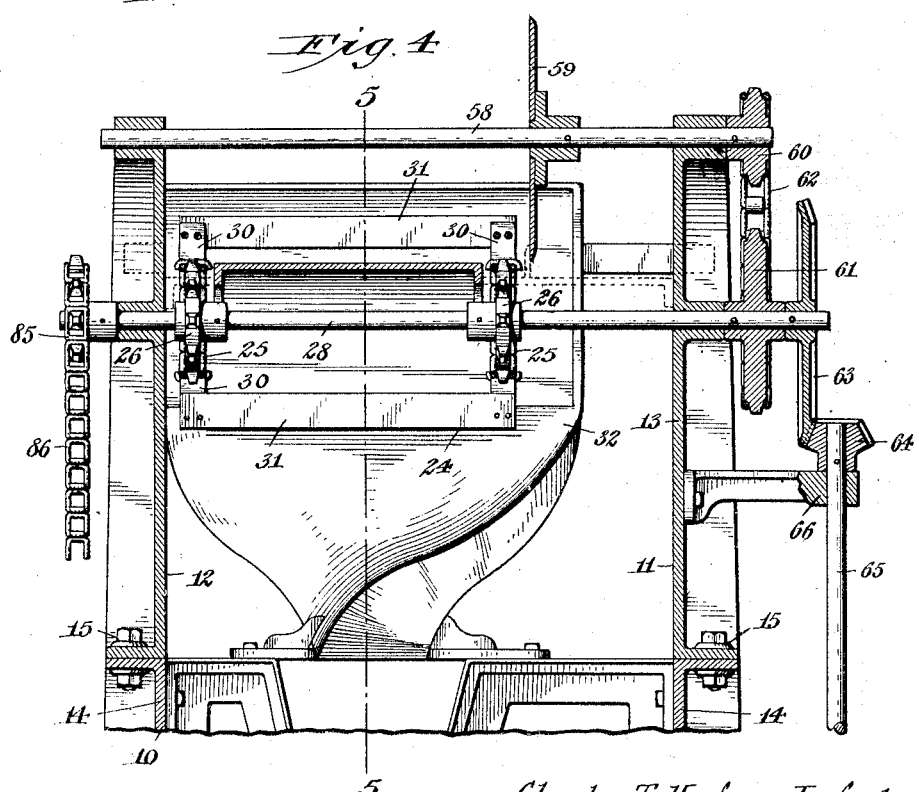

Sept. 10, 1929.   C. T. HOWSON   1,727,507
CORN HUSKING MACHINE
Filed Nov. 2, 1925   3 Sheets-Sheet 3

Witness:
J. J. Oberst.

Charles T. Howson, Inventor.
By Emil Neuhart
Attorney.

Patented Sept. 10, 1929.

1,727,507

UNITED STATES PATENT OFFICE.

CHARLES T. HOWSON, OF SILVER CREEK, NEW YORK.

CORN-HUSKING MACHINE.

Original application filed April 17, 1920, Serial No. 374,682. Divided and this application filed November 2, 1925. Serial No. 66,237.

My invention relates to improvements in corn husking machines, and more particularly to the feeding and "butting" mechanism of such machines.

This application is a division of my application for patent filed April 17, 1920, Serial No. 374,682, allowed June 5, 1925.

This invention has for one of its objects, to equip a machine of this type with means whereby the ears of corn are drawn into the machine and accurately positioned for "butting", with assurance that the butt of each ear will be in proper position to be severed from the remainder of the ear.

Another object of my invention is to construct a machine of this kind with a table at the top so that a delivery bin can be built over the table and deliver the ears of corn thereon and so that the operator can feed the ears of corn into the machine in quick succession, with the butts thereof either to the right or left, depending on the location of the cutting or "butting" mechanism.

Another object of my invention is to provide a machine with a feed tube or chute equipped with means to hold back all the ears of corn but one, and allow only one ear at a time to be delivered to the feeding mechanism.

Another object of my invention is to provide new and improved positioning or placer means, whereby the ears of corn are properly positioned and retained in proper position within the machine while they are traveling therethrough.

A further object of my invention is to provide an adjustable sectional guide, so as to adapt the machine for use in different territories, this being highly desirable due to the fact that in some sections of the country, comparatively small ears of corn are grown, while in others, corn is grown to a comparatively large size.

A still further object of my invention is to provide a sectional guide, which is yieldingly positioned so that ears of corn of different sizes can be passed through the machine without the possibility of the smaller ears moving laterally through the machine and thus result in unnecessarily large portions of the ears being cut away, or even in the ears being passed completely through the guide.

With the above and other objects in view to appear hereinafter, the invention consists in the novel features of construction and in the combination and arrangement of mechanisms and parts to be hereinafter described and more particularly pointed out in the subjoined claims.

In the drawings:—

Figs. 1 and 2 are opposite side views of the upper portion of a corn husking machine in which this invention is embodied.

Fig. 3 is an enlarged transverse section taken on line 3—3, Fig. 2.

Fig. 4 is an enlarged transverse section taken on line 4—4, Fig. 2.

Fig. 7 is an enlarged transverse section taken on line 7—7, Fig. 3.

Fig. 8 is a longitudinal section through a portion of the positioning or placer mechanism.

Fig. 9 is a sectional perspective view of the upper section of the adjustable guide.

Figure 5:
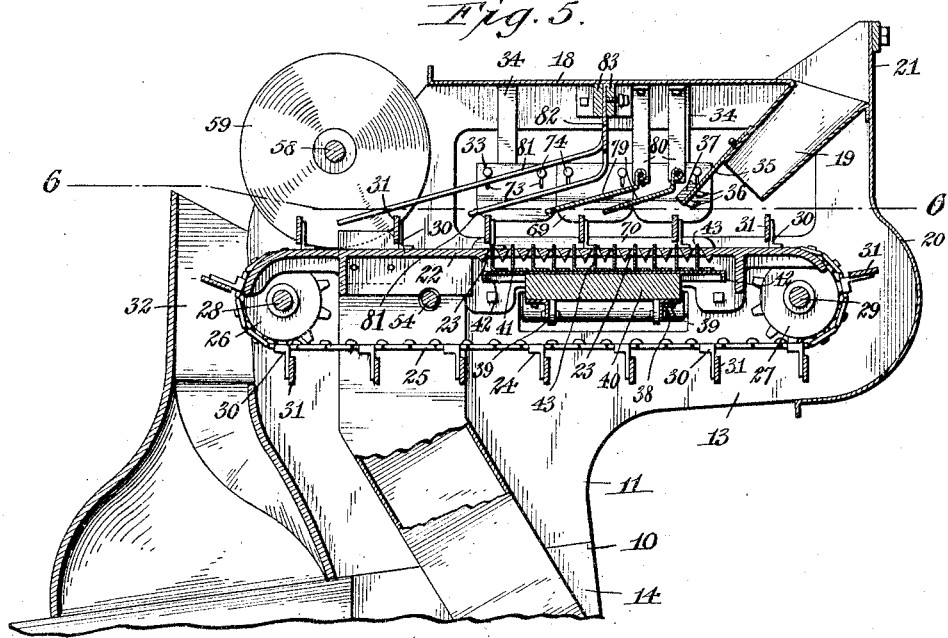
Fig. 5 is a vertical longitudinal section taken on line 5—5, Fig. 4.
Figure 6:
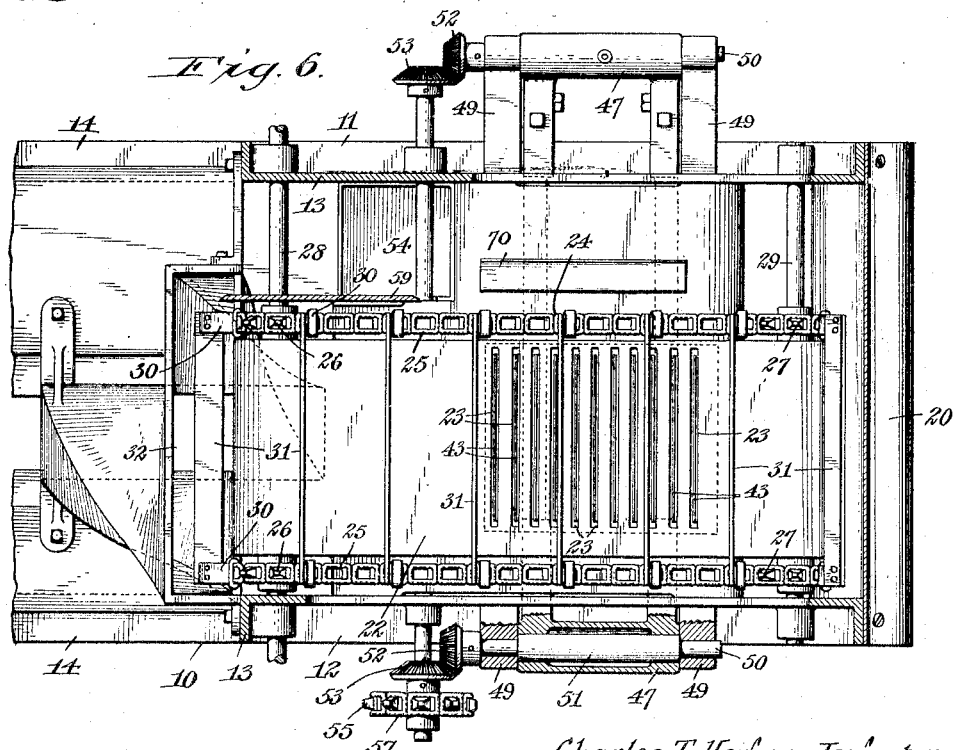
Fig. 6 is an enlarged horizontal section taken on line 6—6, Fig. 5, the presser plates and springs and the upper section of the gage or guide being omitted.

The machine has a suitable frame 10, of which the upper portion only is shown. This frame comprises two connected side members 11, 12, each of which, for convenience in casting and shipping, is formed in two parts 13, 14, only a portion of each of the parts 14 being shown. The parts 13 are bolted or otherwise secured to the upper edges of the parts 14 at one end thereof, as at 15.

The side members may therefore be said to have upper frame parts and lower frame parts. The side members may be held in spaced relation by means of tie bolts, cross members or other like elements commonly employed for such purpose.

As there are various revoluble parts employed in this husking machine, I mount a main or driving shaft 16 in the lower frame parts 14 near one end thereof, and to this shaft a driving pulley 17 is secured. From this shaft, husking mechanism arranged between the two frame parts 14 is operated; also, directly or indirectly, various operating parts herein shown and described. The husking mechanism referred to is omitted, owing to the fact that it forms no part of this divisional application.

Secured to the upper edges of the side members 11 and 12 of the frame, is a receiving table 18 onto which the ears of corn are to be delivered from a hopper, bin or other means, and at the front end of this table, a rearwardly and downwardly inclined feed tube or chute 19 is provided.

The front end of the overhanging portion of the frame is closed by a wall 20 conforming in shape to the formation of the overhanging ends of the upper frame parts 13. This wall is extended upwardly a distance above the tube or chute 19, as at 21, to serve as a stop or abutment for the ears of corn drawn from the table 18 into said tube or chute.

Between the two upper parts 13 of the side members 11 and 12, a feed table 22 is arranged which is fastened to said parts 13 and has transverse slots 23 formed therein, the side walls of said slots diverging downwardly so that the slots are of substantially inverted V-formation in cross section. The feed table 22 extends from a point beneath the tube or chute 19 to the rear ends of the upper parts 13 of said side members 11, 12. As clearly shown in Fig. 3, this table has an elevated portion disposed between its side edges, and in this elevated portion, which is continued from front to rear of the table, said transverse slots 23 are arranged. Said slots, however, extend only along a portion of the length of this elevated portion, as best shown in Fig. 5.

24 designates an endless feeding device comprising two endless sprocket chains 25 which pass around sprocket wheels 26, 27, fastened to transversely-disposed shafts 28, 29. The sprocket wheels 26 are spaced apart on the shaft 28, and the sprocket wheels 27 are spaced apart on the shaft 29. Each sprocket wheel 26 is longitudinally alined with a sprocket wheel 27 and the sprocket wheels so alined, serve as two pairs of wheels around which the sprocket chains 25 travel. These sprocket chains are disposed in planes at opposite sides of the elevated portion of the table 22, and at regular intervals each chain is provided with brackets or outwardly-directed lugs 30, the lugs of opposite sprocket chains being paired and having transverse bars or feeders 31 secured thereto. Said bars or feeders, of course, form part of said endless feeding device and travel over said table in a rearward direction and in slightly spaced relation thereto, and they also travel beneath said table at a somewhat greater distance therefrom.

The feeding device 24 is adapted to cause the ears of corn delivered onto the feed table 22 from the feed tube or chute 19 to be moved rearwardly over said table and be delivered from the rear end of the same into a delivery chute 32 directed downwardly and adapted to deliver the ears of corn onto husking mechanism, preferably disposed directly beneath said endless feeding mechanism.

The ears of corn delivered onto the receiving table 18 are directed into the feed tube or chute 19 by an operator stationed at the front end of the machine, and while directing the ears of corn into said tube or chute they are all positioned with their butts to the right. When thus positioned they gravitate through said chute and are delivered onto the feed table 22 where they are drawn rearwardly from the endless feeding device 24. By means of suitable placer mechanism, to be presently described, the ears of corn are all moved toward the right and retained against a gage or guide 33, which receives support from hangers 34 fastened to the receiving table 18. The ears of corn are therefore delivered from the feed table 22 into the delivery chute 32 from which latter they pass on to the husking mechanism.

With a view of assuring the delivery of a single ear of corn at a time onto the feed table 22, a gate 35 is hinged to the rear wall of the tube or chute 19, and this gate is provided with means to create friction against the gravitating ears of corn, or with means to engage the corn in such a manner as to assure retention of all of the ears of corn passing through the chute 19, excepting one only.

In preferred form this gate has on its front face a number of upwardly curved prongs 36, and to its rear face a metallic bar or other element 37 is secured to furnish the proper weight to keep the gate in its lowermost or normal position. This gate may be referred to as retarding or regulating means, and it will be noticed that by applying such retarding or regulating means to the lower end of the tube or chute 19, one ear of corn will be delivered between adjacent bars or feeders 31 of the feeding device as they travel underneath the tube or chute, assurance being had that a continuous feeding of corn through the machine takes place with an ear of corn in each space between adjacent bars or feeders.

Associated with the feed table 22 and coacting with the transverse slots 23 therein is what I term "Placer mechanism", which, in its preferred form, comprises a transversely-disposed frame 38 having two spaced bars 39 to which a flat wooden member 40 is bolted or otherwise secured. On said wooden member, a plate of sheet metal 41 is fastened, with the marginal portions thereof bent downwardly, as at 42, the downwardly bent portions of said plate along opposite sides being in contact with opposite side edges of said wooden member. At opposite ends this plate overhangs the wooden member, as shown in Fig. 5.

Fastened to the upper surface of the plate 41 is a series of transversely-disposed toothed upstanding blades 43, which are angular in cross section to provide securing webs 44 along their lower portions so that these blades may be properly fastened to said plate 41. The teeth of these blades are at their upper edges, each tooth having an inclined portion 45 and an abrupt vertical portion 46 (see Fig. 8); the abrupt vertical portions facing toward the gage or guide 33.

Connecting corresponding ends of the spaced bars 39 of the frame 38 and forming part of said frame are castings 47, each casting being provided with a circular bore 48. Fastened to the frame of the machine at opposite ends of each casting 47 are brackets 49 in which a shaft 50 is journaled, each shaft having an eccentric intermediate portion 51, preferably somewhat larger than the end portions thereof which are journaled in the brackets 49.

To the rear end of each of the shafts 50, a bevel gear 52 is secured, and these bevel gears mesh with bevel gears 53 fastened to a transverse shaft 54 suitably journaled in the frame of the machine.

To one end of the shaft 54 a sprocket wheel 55 is keyed or otherwise fastened, and passing around this sprocket wheel and a sprocket wheel 56 on the main or driving shaft 16 is a sprocket chain 57. The shaft 54 is therefore driven directly from the main or driving shaft 16 and through the medium of the bevel gears 53 and 52, imparts motion to the eccentric shafts 50. In this manner the placer mechanism is given a combined transversely reciprocating and vertical, or shaking movement, which causes the toothed blades 43 to move transversely with a component up and down movement so as to project the teeth of the same above the upper surface of the feed table 22 while moving toward the gage or guide 33; also to cause withdrawal of said blades so that the teeth will recede and at the same time move away from said gage or guide. In this manner the ears of corn being fed over the feed table 22 by the endless feeding device is moved into contact with the gage or guide 33 and maintained in such position with the butts of the ears properly positioned to be severed from the remainder of the ears and with any stalks that may be on the ears projecting beyond said gage or guide. It will be apparent therefore that the placer mechanism embodies one or more elements movable at least laterally and preferably toward and from a gage or guide so that all of the ears of corn while passing over the feed table, or while being fed through the machine for the purpose of removing the butts therefrom, are moved lengthwise into what may be termed a butting position and are maintained in such position, at least until the butts are cut therefrom.

Arranged transversely and journaled in the upper parts 13 of the side members 11, 12, is a shaft 58, and fastened to this shaft is a rotatable butting knife or cutter 59, by means of which the butts of the ears of corn are severed from the remainder of the ears. To one end of this shaft 58 a sprocket wheel 60 is secured, and passing around this sprocket wheel and a second sprocket wheel 61 secured to the shaft 28 of the endless feeding device is a sprocket chain 62. On the shaft 28 adjacent the sprocket wheel 61, a bevel gear 63 is secured, and meshing with said bevel gear is a comparatively small bevel gear 64 fastened to the upper end of a shaft 65 journaled in bearings 66 secured, respectively, to the upper and lower parts 13, 14 of the frame at one side of the machine (see Fig. 2). At or near the lower end of said shaft 65 a bevel gear 67 is secured and this gear is in mesh with a bevel 68 fastened to the main or drive shaft 16.

The endless feeding device is therefore driven from the main shaft 16 through the medium of the bevel gears 68, 67, shaft 65, bevel gears 64, 63, and shaft 28, and the rotating knife or cutter is driven from the shaft 28 through the medium of the sprocket wheel 61 on said shaft 28, sprocket chain 62 and sprocket wheel 60 on the shaft 58. The shaft 58, knife or cutter 59 and means rotating said shaft or operative parts thereof may be termed butting mechanism.

As clearly shown in Fig. 3 of the drawings, the gage or guide 33 comprises an upper section 69 and a lower section 70, the upper section comprising a longitudinal bar 71 fastened to the supports or hangers 34 and a plurality of abutting plates 72 having vertical slots 73 therein through which screw bolts or other sustaining means 74 are passed, said screw bolts projecting from said longitudinal bar. The lower portion of each plate 72 is inclined downwardly and outwardly, as at 75.

The lower section of said gage or guide comprises a single plate secured to the feed table 22 and having its upper portion reversely inclined or directed outwardly and upwardly, as at 76. The two inclined portions 75, 76 provide an outwardly restricted guideway into which the butts of the ears of corn are forced by the placer mechanism, as shown in dotted lines in Fig. 3, and when an ear of corn has a portion of a stalk thereon, the stalk may extend out through the space 77. Each of the hangers 34 may be provided with a plurality of bolt holes arranged in vertical alinement (see Fig. 9) so that the longitudinal bar 71 supporting the abutting portion of the upper section 69 of said gage or guide may be fastened at different heights and the sections of the gage or guide adjusted to accommodate different runs of corn gaged by size, depending upon the locality in which it is grown. Regardless of the size of the general run of corn grown in any locality, it will be found that some of the ears are of greater diameter than others, and by having the upper section of the gage or guide made of a plurality of independently movable parts, or more particularly self-adjusting parts movable in a plane perpendicular to the feed table 22, one part will assume a different position than another when the ears of corn in contact therewith are of different diameters, and consequently a small ear may immediately follow a larger ear with full assurance that the gage or guide will properly hold the ears in place while traveling rearwardly along the feed table 22.

Extending transversely above the feed table 22 and directly in rear of the regulating gate 35 are pivoted presser plates 79, the pivots of these plates being journaled in hangers 80 at opposite sides of the machine. In rear of said presser plates a plurality of flexible presser elements in the form of presser springs 81 are provided, said presser springs being inclined downwardly and rearwardly from their front ends and having at their front ends upwardly directed portions 82 fastened between transverse bars 83 secured to opposite side members, or otherwise. The pivoted presser plates 79 and the presser springs 81 act against the ears of corn positioned between the transverse bars or feeders 31 of the feeding device and hold said ears in proper position so as to cause the butts thereof to move against the rotating knife or cutter 59. The butts are severed from the remainder of the ears of corn and delivered into a chute 84 opening at its upper end adjacent said knife or cutter and discharging at a lower point of the machine in any suitable manner.

As stated, a bevel gear wheel 63 is secured to one end of the shaft 28. To the other end thereof a sprocket wheel 85 is secured around which a sprocket chain 86 is passed which is utilized to operate other parts of the machine situated in a lower plane and forming no part of this divisional application.

The operation of the device is as follows:

The ears of corn delivered onto the receiving table 18 are drawn forwardly by an operator stationed at the front of the machine and are positioned with butts at one side of the machine. In the particular machine shown in the drawings, the ears would be positioned with the butts to the right to allow them to pass downwardly through the chute 19. The ears of corn are engaged one at a time by the regulating means 35 so that they are delivered successively to the spaces between the transverse bars or feeders 31 of the endless feeding device with their axes transversely disposed and the butts to the right. While the ears of corn are traveling rearwardly, they are engaged by the placer mechanism and forced laterally into position with respect to the gage or guide 33, the toothed blades of the placer mechanism acting to move the ears into such position while the presser plates 79 bear down upon the ears of corn and serve to retain the ears while traveling rearwardly in placed position. As the corn leaves the gage or guide 33 and passes beyond the placer mechanism, it is retained in position by the presser springs 81 and while so retained the ears of corn are brought into contact with the butting mechanism and more particularly, with the peripheral edge of the rotatable knife or cutter 59. The butts with the stalks, if any thereon, are severed from the remainder of the ears by the butting mechanism, the butts entering the upper open end of the chute 84 and by it being directed downwardly to be discharged from the machine in any approved manner. The ears of corn with the butts removed therefrom continue on their course disposed in transverse positions, and are delivered from the feeding device into the upper end of the chute 32 by means of which they are passed to the husking mechanism, where the husks are removed from the corn and discharged in any suitable manner and the ears of corn freed of husks preferably also of silk, are discharged from the machine.

Having thus described my invention, what I claim is:—

1. A corn husker comprising a feed table, feeding mechanism, a guide associated with said feed table and feeding mechanism and along which the butt ends of ears of corn are adapted to travel, said guide being at least in part self-adjustable in a plane perpendicular to said table, and means for placing said ears of corn for butting operation.

2. A corn husker, comprising a feed table, feeding mechanism causing ears of corn to travel lengthwise over said table while disposed transversely thereon, and means extending upwardly through said table for successively moving the ears of corn laterally to place the butt ends thereof into corresponding positions for butting operation.

3. A corn husker, comprising a feed table, feeding mechanism for causing ears of corn to move along said table in one direction, and a placer device extending upwardly through said table and movable in a vertical plane to engage and force the ears of corn in another direction so as to place the butt ends of said ears of corn in corresponding positions for butting operation.

4. A corn husker, comprising a feed table having an opening therethrough, feeding mechanism serving to move ears of corn disposed parallel along said table, a movable element extending upwardly through the opening in said table and having an engaging surface to engage and move said ears of corn lengthwise so as to place the butt ends thereof in alinement, and means for butting the ears of corn while so placed.

5. A corn husker comprising a feed table, feeding mechanism, and a guide associated with said table and feeding mechanism embodying means in its construction to cause ears of corn to travel in a straight line and along which the butt ends of ears of corn are adapted to travel, said guide being at least in part self-adjustable in a plane perpendicular to said feed table.

6. A corn husker comprising a feeding mechanism and a sectional guide associated with said feeding mechanism and along which the butt ends of ears of corn are adapted to travel, each section of the guide being independently movable in a plane perpendicular to said feeding mechanism.

7. A corn husker comprising feeding mechanism and a sectional guide along which the butt ends of ears of corn are adapted to travel, said guide being at least in part self-adjustable in a plane perpendicular to said feeding mechanism and the relative adjustment of the sections of said guide being according to the diameters of the ears of corn to be guided.

8. A corn husker comprising feeding mechanism and a yielding guide associated with said feeding mechanism and along which the butt ends of the ears of corn are adapted to travel, said guide yielding in a plane perpendicular to said feeding mechanism.

9. A corn husker comprising feeding mechanism and a sectional guide having one of its sections yieldingly supported and arranged for self adjustment in a plane perpendicular to said feeding mechanism and along which the butt ends of ears of corn are adapted to travel.

10. A corn husker comprising a feed table, feeding mechanism adapted to feed ears of corn over and along said table, and a guide in a plane above said table and to one side of said feeding mechanism having sections capable of being elevated independently by the ears of corn moved along said table, the butt ends of the ears of corn being adapted to travel along said guide and in contact therewith.

11. In a corn husker, a guide comprising two separate members arranged one above the other, the lower member having an upwardly and outwardly-directed flange and the upper member having a downwardly and outwardly-directed flange spaced from the flange of the lower member and between which flanges the stems or stalks of ears of corn are adapted to pass while the butt end of the ears are in moving contact with said flanges.

12. A corn husker comprising a feed table, feeding mechanism adapted to cause ears of corn to be moved over and along said table, a guide at one side of said feed table at least in part self-adjustable in a plane perpendicular to said table, and a butting device associated with said guide to cut off the butts of the ears of corn.

13. A corn husker comprising a feed table, feeding mechanism co-operating with said table, means for delivering ears of corn onto said feed table, a guide comprising an upper and a lower section separated by a guide passage, said guide being in rear of said delivering means, and means for cutting off the butts from the ears of corn arranged in rear of said guide.

14. A corn husker comprising a receiving table, a feed table beneath and spaced from said receiving table, a delivery chute at one end of said receiving table directed towards said feed table, and feeding means co-operating with said feed table.

15. A corn husker comprising a receiving table, a delivery chute at one end of said receiving table provided with retarding means to prevent the delivery of more than one ear of corn at a time from said chute.

16. A corn husker comprising a receiving table, a delivery chute at one end of said receiving table, and a gate hinged to said chute and provided with retarding means adapted to engage the corn passing from said chute.

17. In a corn husker, a receiving table, a delivery chute extending downwardly from said receiving table, a gate hinged to the rear wall of said chute and having forwardly projecting prongs thereon.

18. In a corn husker, a feed table, an endless feeding device having transversely-disposed bars passing along said feed table and between adjoining bars of which an ear of corn is to be deposited, and yielding retainer devices positioned over said feed table and adapted to retain the ears of corn against the table while they are being drawn forwardly by said transverse bars.

19. A corn husker comprising a feed table, an endless feeding device having transverse bars movable along said feed table, and a pivoted retainer element adapted to bear downwardly against the ears of corn moved forward by said transverse bars.

20. In a corn husker, the combination of a feed table, a feeding device including transverse bars passing in spaced relation along said table, a pivoted retainer element positioned above said table, and a spring retainer element in rear of said pivoted retainer element also positioned above said table, both retainers bearing downwardly against the ears of corn carried along by said transverse bars.

21. In a corn husker, the combination of a feed table, endless feeding mechanism passing around said table and having transverse bars traveling in spaced relation to the upper surface of said table, a plurality of pivoted retainer members inclined downwardly and rearwardly and being positioned above said table to bear downwardly against ears of corn carried along by said transverse bars, and a plurality of flexible retainer members also positioned above said table in advance of said pivoted retainer members.

22. A corn husker comprising a feed table, feeding mechanism co-operating with said table, and a guide situated to one side of said feeding mechanism, said guide comprising an upper and a lower member spaced apart, said upper member comprising a plurality of sections individually movable in a vertical direction and vertically-adjustable together.

23. In a corn husker, a guide comprising a continuous lower member and an upper member formed of a plurality of sections and a support for said sections, said support having projecting pins and each of said sections having slots through which said pins are passed, thereby enabling the sections to move vertically independently of each other.

24. In a corn husker, the combination of a feed table having transverse slots therein, means for feeding ears of corn along said table and over said slots, a guide at one side of said table, and placer mechanism having parts operable through the slots of said table to engage the ears of corn.

25. A corn husker comprising a feed table, means for feeding ears of corn along said table, a guide at one side of said table, and placer mechanism for moving and retaining the ears of corn against said guide, said placer mechanism being mounted for lateral reciprocating movement.

26. A corn husker comprising a feed table, means for feeding ears of corn along said table, a guide at one side of said table, and placer mechanism for moving and retaining the ears of corn against said guide, said placer mechanism being mounted for combined lateral and vertical movement.

27. In a corn husker, the combination of a feed table having transverse slots therethrough, blades transversely movable in said slots and having toothed upper edges, means for feeding ears of corn along said table, and a guide at one side of said table against which the ears of corn are moved and retained by said toothed blades.

28. In a corn husker, a feed table provided with transverse slots, a frame arranged transversely underneath said feed table and having a bearing at each side of the machine, eccentric shafts passing through said bearings, means for rotating said shafts, and transversely-disposed blades toothed along their upper edges and secured to said frame, said blades being positioned within the transverse slots of said feed table.

29. In a corn husker, the combination of a feed table having a series of transverse slots, a receiving table above said feed table having a chute extending downwardly and rearwardly therefrom to deliver ears of corn onto said feed table in rear of said slots, feeding mechanism for moving the ears of corn along said table, a guide at one side of said table substantially co-extensive with the slotted region thereof, a series of blades extending into said slots and having toothed upper edges, and means for imparting a combined vertical and transverse movement to said blades to cause the ears of corn to be moved and retained against said guide while fed along the feed table by said feeding mechanism.

30. A corn husker having a longitudinal feed table provided with a series of transverse slots between its ends, means for feeding ears of corn along said feed table, a guide at one side of said feed table opposite said slots, feeding mechanism for moving ears of corn along said table, placer mechanism having parts adapted to move lengthwise and upwardly and downwardly through said slots, and means in rear of said guide for cutting off the butts of the ears of corn.

31. A corn husker comprising side frame members, a longitudinal feed table secured to and between said side frame members, a placer frame arranged transversely underneath said feed table and extending through said side members, eccentric means at opposite ends of said placer frame for reciprocating the same and simultaneously therewith imparting upward and downward movement thereto, spaced placer elements carried by said placer frame, and means for moving ears of corn along said feed table, said spaced placer elements engaging said ears of corn to move the same laterally with their butt ends alined.

32. In a corn husking machine, means for cutting off the butts from ears of corn, feeding mechanism to cause said ears of corn to travel past said cutting means, means associated with said feeding mechanism movable upwardly and laterally therethrough to move the butt ends of the ears of corn in line with said cutting means, and means to regulate the last-mentioned movement of said ears of corn.

33. In a corn husking machine, a feed table having an opening, means for cutting off the butts from the ears of corn arranged at one side of said feed table, feeding mechanism including two spaced chains lying at opposite sides of said opening in said table, said feeding mechanism causing the ears of corn to travel lengthwise over said table while disposed transversely thereon, and a device operable through the opening in said table to engage the ears of corn and move the same laterally over said table to bring the butt ends thereof in line with said cutting means.

34. In a corn husking machine, a feed table, means for cutting off the butts from the ears of corn arranged at one side of said feed table, feeding mechanism to cause the ears of corn to travel lengthwise over said table while disposed transversely thereon, and a device operable upwardly through said table and having a combined vertical and lateral movement, said device being adapted to engage the ears of corn and move the same laterally into position to be severed by said cutting means.

35. A corn husking machine, comprising a gage, a conveyer for conveying ears of corn in crosswise position past said gage, means for cutting off the butts from the ears of corn which is arranged beyond said gage and past which the ears of corn are moved by said conveyer for severing the butts from the ears of corn, and placing means situated mainly within the confines of said conveyer for moving the ears transversely of said conveyer and toward said gage before reaching said cutting means comprising an element having movement toward and from said gage and adapted to engage the under side of the ears of corn.

36. A corn husker comprising a feed table, feeding mechanism for feeding corn along said table, a guide associated with said feed table and feed mechanism and along which the butt ends of ears of corn are adapted to travel, said guide comprising upper and lower sections spaced apart to form a guideway for the corn, and said upper section being formed of sections disposed end to end and individually self-adjustable, and means for placing said ears of corn for butting operation.

In testimony whereof I affix my signature.

CHARLES T. HOWSON.